UNITED STATES PATENT OFFICE.

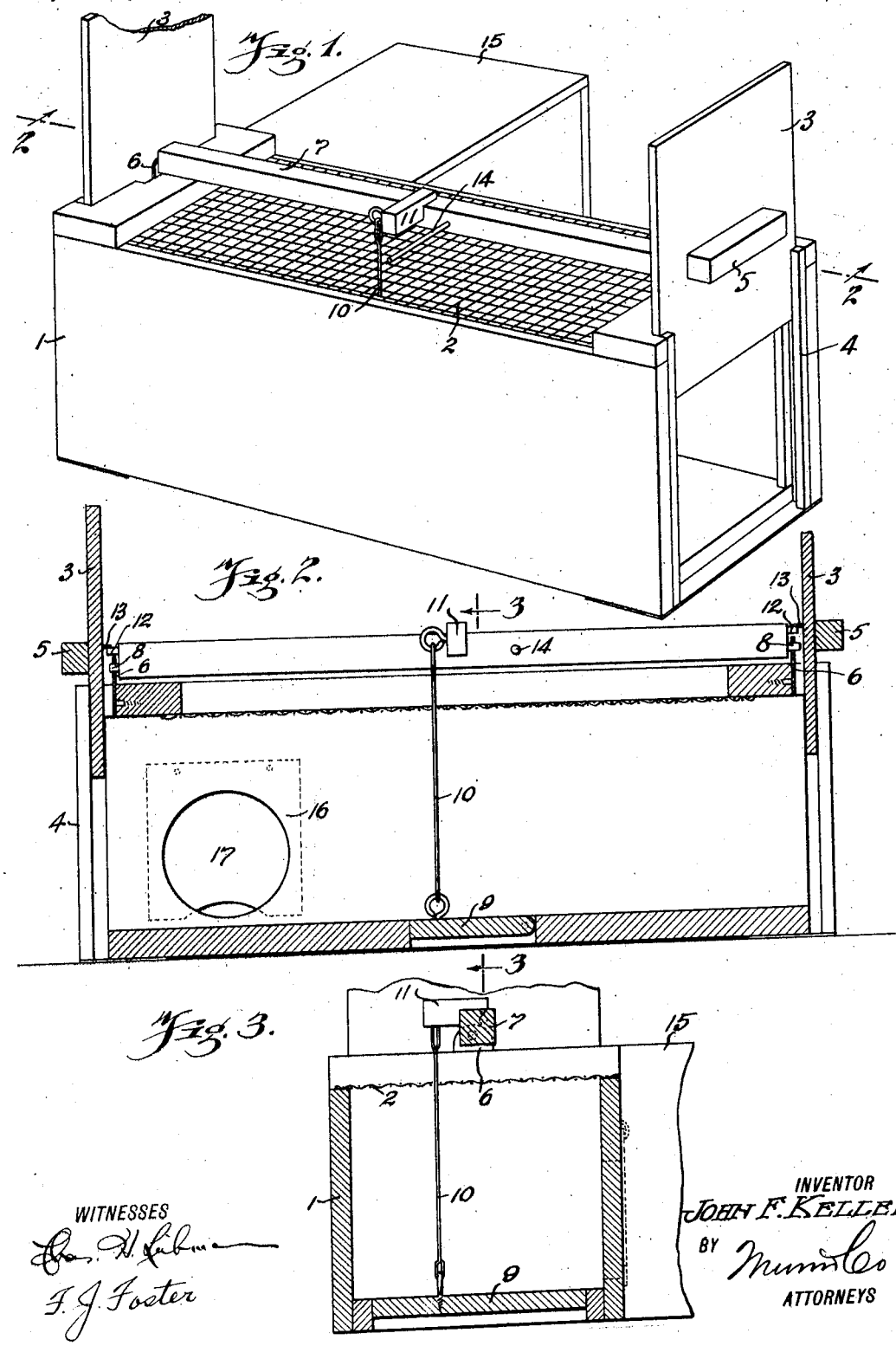

JOHN FREDRICK KELLER, OF OTTOVILLE, OHIO.

RAT TRAP.

1,406,028. Specification of Letters Patent. Patented Feb. 7, 1922.

Application filed April 26, 1921. Serial No. 464,517.

*To all whom it may concern:*

Be it known that I, JOHN F. KELLER, a citizen of the United States, and a resident of Ottoville, in the county of Putnam and State of Ohio, have invented a new and Improved Rat Trap, of which the following is a full, clear, and exact description.

This invention relates to improvements in rat traps, an object of the invention being to provide a trap equipped with a novel form of trigger mechanism which will quickly operate the trap after a rat has entered.

Another object is to provide a rat trap which will be exceedingly simple and practical in construction, which will be strong, durable and efficient in use, which may be easily kept clean, and which will be comparatively inexpensive to manufacture.

With these and other objects in view, the invention consists of certain novel features of construction and combinations and arrangements of parts as will be more fully hereinafter described and pointed out in the claims.

In the accompanying drawings:—

Figure 1 is a perspective view of my improved rat trap in set position;

Figure 2 is a view in longitudinal section on the line 2—2 of Figure 1; and

Figure 3 is a view in transverse section on the line 3—3 of Figure 2.

Referring in detail to the drawings, my improved trap comprises an elongated rectangular casing 1. A wire screen such as 2, constitutes the top of the casing. The ends of the casing are closed by doors 3 slidable vertically in door frames 4. Any preferred kind of handle members such as 5, may be provided for manually lifting the doors. Upwardly extending brackets 6 are attached to the door frame. A bar 7 of the rectangular cross section illustrated, is provided at each end with a trunnion 8 journaled in one of the brackets 6.

A trap door or platform 9 hinged in the bottom of the casing is operatively connected to the bar 7 through the medium of a link 10 and a laterally extending arm 11 rigidly connected to the bar 7.

Triggers 12 carried by the ends of the bar 7 are engageable under lugs 13 carried by the doors 3 to support these doors in elevated position. The triggers 12 are normally maintained out of the path of the lugs by a balancing arm 14 extending laterally from the arm 11, and by operating the arm 14 to rotate the bar 7, the triggers 12 may be moved into position to support the lugs 13. The weight of the doors 3 will then overcome the weight of the arm 14 and will hold the bar 7 against accidental turning on its trunnions.

In operation, the doors are supported in the elevated position illustrated in the drawings. Any suitable bait (not shown) is positioned in the trap adjacent the door or platform 9. A rat entering the trap will step upon the platform 9 and operate through the medium of the link 10 and arm 11 to turn the bar 7 on its trunnions, move the triggers 12 out of engagement with the lugs 13 and permit the doors 3 to fall by gravity.

A rectangular box or casing 15 communicates with an opening 16 in the side of the casing 1. The opening 16 is closed by a hinged door or flap 17 permitting ready ingress to the casing 15 and effectively blocking egress. After a rat has been caught in the trap, he will pass through the door 17 seeking a way to freedom. The door 17 effectively prevents his return into the trap and the trap may again be set.

Although I have illustrated one of the preferred embodiments of my invention, it will be apparent that various slight changes and alterations might be made in the general form and arrangement of the parts described without departing from the invention and hence I do not wish to limit myself to the precise details set forth, but shall consider myself at liberty to make such slight changes and alterations as fairly fall within the spirit and scope of the appended claims.

I claim:

1. An animal trap including a casing, vertically slidable doors normally closing the ends of the casing, a bar journaled across the top of the casing, means associated with the bar for supporting a door in elevated position, means whereby rotation of the bar permits the door to close.

2. An animal trap including a rectangular casing, vertically slidable doors normally closing the ends of the casing, upstanding brackets on the ends of the casing, a bar across the top of the casing, trunnions on the ends of the bar journaled in the brackets, means associated with the ends of the bar for supporting the doors in elevated position, and means whereby rotation of the bar on its trunnions permits the doors to fall by gravity.

3. An animal trap including a rectangular casing, vertically slidable doors normally closing the ends of the casing, upstanding brackets on the ends of the casing, a bar across the top of the casing, trunnions on the ends of the bar journaled in the brackets, means associated with the ends of the bar for supporting the doors in elevated position, a hinged trap door in the casing, means operatively connecting the trap door and bar, whereby a weight upon the trap door turns the bar on its trunnions, and means whereby such turning of the bar permits the doors to fall by gravity.

4. An animal trap including a rectangular casing, vertically slidable doors closing the ends of the casing, bearing brackets fixed to the ends of the casing, a bar journaled above the casing in the bearing brackets, triggers carried by the ends of the bar, lugs carried by the doors and adapted to be supported on the triggers, means whereby rotation of the bar disengages the triggers and lugs and permits the doors to fall by gravity.

5. An animal trap including a rectangular casing, vertically slidable doors closing the ends of the casing, bearing brackets fixed to the ends of the casing, a bar journaled above the casing in the bearing brackets, triggers carried by the ends of the bar, lugs carried by the doors and adapted to be supported on the triggers, means whereby rotation of the bar disengages the triggers and lugs and permits the doors to fall by gravity, and means whereby the weight of a rat in the trap turns said bar.

6. An animal trap including a rectangular casing, vertically slidable doors closing the ends of the casing, bearing brackets fixed to the ends of the casing, a bar journaled above the casing in the bearing brackets, triggers carried by the ends of the bar, lugs carried by the doors and adapted to be supported on the triggers, means whereby rotation of the bar disengages the triggers and lugs and permits the doors to fall by gravity, and means whereby the weight of a rat in the trap turns said bar, said last mentioned means including a platform hinged in the bottom of the casing, an arm extending laterally from the bar and a link operatively connecting the platform and arm.

JOHN FREDRICK KELLER.